(12) United States Patent
Muska et al.

(10) Patent No.: US 10,811,695 B2
(45) Date of Patent: Oct. 20, 2020

(54) PROCESS AND SYSTEM FOR RECYCLING ALKALINE AND CARBON ZINC BATTERIES

(71) Applicant: Energizer Brands, LLC, Saint Louis, MO (US)

(72) Inventors: David Muska, Lorain, OH (US); Donald Goedde, Avon Lake, OH (US); Richard Resnick, Highland Heights, OH (US)

(73) Assignee: Energizer Brands, LLC, Saint Louis, MO (US)

( * ) Notice: Subject to any disclaimer, the term of this patent is extended or adjusted under 35 U.S.C. 154(b) by 210 days.

(21) Appl. No.: 15/563,007

(22) PCT Filed: Apr. 8, 2016

(86) PCT No.: PCT/US2016/026686
§ 371 (c)(1),
(2) Date: Sep. 29, 2017

(87) PCT Pub. No.: WO2016/164752
PCT Pub. Date: Oct. 13, 2016

(65) Prior Publication Data
US 2018/0366740 A1    Dec. 20, 2018

Related U.S. Application Data

(60) Provisional application No. 62/144,717, filed on Apr. 8, 2015.

(51) Int. Cl.
*H01M 6/52* (2006.01)
*H01M 10/54* (2006.01)
*C22B 47/00* (2006.01)

(52) U.S. Cl.
CPC ............... *H01M 6/52* (2013.01); *C22B 47/00* (2013.01); *H01M 10/54* (2013.01); *Y02W 30/84* (2015.05)

(58) Field of Classification Search
USPC ........................................................ 209/642
See application file for complete search history.

(56) References Cited

U.S. PATENT DOCUMENTS 2,212,265 A * 8/1940 Downing, Jr. ........ B07B 13/003
                                                    209/642
5,352,270 A * 10/1994 Shackle .................. C22B 7/006
                                                    423/179.5

(Continued)

FOREIGN PATENT DOCUMENTS

EP          0578688 A1       1/1994
WO       WO-9217791 A1 *  10/1992 ............. B03B 9/061

OTHER PUBLICATIONS

Machine Translation of WO9217791 via Espacenet (Year: 2019).*

(Continued)

*Primary Examiner* — Coris Fung
*Assistant Examiner* — Christopher Douglas Moody
(74) *Attorney, Agent, or Firm* — Alston & Bird LLP (57) ABSTRACT

The present technology relates to processes for recycling alkaline and/or carbon zinc batteries. In particular, the present technology relates to a process for recycling alkaline and/or carbon zinc batteries that provides a consistent and measurable amount of material (e.g., discarded batteries) to be recycled and may enhance the recovery of certain materials during the recycling process.

16 Claims, 2 Drawing Sheets

(56) References Cited

U.S. PATENT DOCUMENTS

| | | | |
|---|---|---|---|
| 5,429,889 A | 7/1995 | Tu Xuan et al. | |
| 5,498,360 A * | 3/1996 | Kanemaru | B03B 9/061 241/20 |
| 8,911,696 B1 * | 12/2014 | Smith | C01G 45/02 423/101 |
| 2008/0317650 A1 * | 12/2008 | Boren | B01J 20/06 423/50 |
| 2015/0118940 A1 | 4/2015 | Deighton | |

OTHER PUBLICATIONS

Ebadian et al., "Mercury Contaminated Material Decontamination Methods: Investigation and Assessment" Hemispheric Center for Environmental Technology (HCET) (Year: 2001).*

International Searching Authority, International Search Report and Written Opinion for International Application No. PCT/US2016/026686, dated Jun. 22, 2016, 7 pages, Netherlands.

* cited by examiner

PROCESS AND SYSTEM FOR RECYCLING ALKALINE AND CARBON ZINC BATTERIES

CROSS REFERENCE TO RELATED APPLICATIONS

This application is a National Stage Application, filed under 35 U.S.C. § 371, of International Application No. PCT/US2016/026686, filed Apr. 8, 2016, which claims priority to U.S. Application No. 62/144,717, filed Apr. 8, 2015; the contents of both of which are hereby incorporated by reference in their entirety.

BACKGROUND

Related Field

The present technology relates to processes for recycling alkaline and/or carbon zinc batteries. In particular, the present technology relates to methods, and systems to recycle spent consumer batteries in a manner that maximizes recovery of materials by monitoring and controlling various, salient process parameters.

Description of Related Art

Alkaline and carbon zinc batteries account for about 85% of all batteries discarded by consumers. As the demand for batteries containing recycled materials increases, the need for more efficient recycling processes also increases.

Processes for recycling alkaline and/or carbon zinc batteries are described in U.S. Pat. No. 8,911,696 to Smith, et al., which is hereby incorporated by reference in its entirety. A variety of other chemical and/or mechanical methods for recovering metals, and particularly manganese and/or zinc from discharged alkaline batteries, are known in the art. Most of the chemical methods, including but by no means limited to the aforementioned '696 patent to Smith, rely on acidic (e.g., sulfuric, nitric, etc.) or other digestion of the feedstock, followed by selective solubilization and precipitation steps, to separate the pertinent metals into reusable materials.

Consequently, a need for a more efficient processes for obtaining recycled material from discarded battery feedstock exists. In particular, a system that automatically calculates reagent amounts and/or adjusts feed and other system parameters would be welcome. To the extent the inventors have identified a heretofore unrecognized need to control levels of certain impurities in the intended end products to optimize recovery of targeted materials, a method and system for eliminating or controllably reducing these impurities from the desired end products would be welcomed.

BRIEF SUMMARY

The present technology provides, in one aspect, a process for recycling alkaline and/or carbon zinc batteries comprising providing a consistent and measurable amount of material (e.g., discarded batteries) to be recycled and may enhance the recovery of certain materials (e.g., zinc and manganese) during the recycling process with minimal unwanted impurities (e.g., potassium) retained in the recovered materials.

In one aspect of the invention, the approximate amount of zinc and/or manganese present in the feedstock is calculated prior to the selective solubilization and/or precipitation, so as to better inform the amount of reagent(s) needed to recover the zinc and/or manganese based on this determination. In the same manner, the calculated values can be used to control the amount of feedstock provided to the comminution operation, so as to avoid overloading other steps in the process.

In another aspect of the invention, at least one of the steps of the process for recycling alkaline and/or carbon zinc batteries is an automated step. In one embodiment, the entire process is automated.

Thus, in one embodiment, a system for recovering metal from a feedstock including batteries comprises any combination of the following steps:

a pre-sorter that delivers batteries having selected characteristics to a comminutor having an adjustable rate of operation, by way of a first conveyor having an adjustable rate of operation;

a digester connected to the comminutor by way of a second conveyor having an adjustable rate of operation, wherein the digester produces a precipitate stream and a liquid stream;

a control system that collects information on the selected characteristics of the batteries and at least one of: the rate of operation of the comminutor, the rate of operation of the first conveyor, the rate of operation of the second, and wherein, in response to the collected information, the control system subsequently adjusts at least one of: the rate of operation of the comminutor, the rate of operation of the first conveyor, and the rate of operation of the second conveyor;

wherein the precipitate stream includes at least one recoverable metal;

a temperature-controlled fluid source providing fluid of a selected temperature to at least one of: the comminutor, the digester, and the precipitate stream;

wherein the control system also collects information on at least one of: the temperature of the fluid source, characteristics of material delivered by the comminutor to the digester, an observed pH level in the digester, and an observed pH level in the liquid stream;

wherein, in response to the collected information, the control system adjusts at least one of: the temperature of fluid provided to the precipitate stream, the temperature of fluid provided to the comminutor, the temperature of fluid delivered to the digester, and an amount of pH-adjusting reagent delievered to the digester;

wherein the selected characteristics are at least one of: cylindrical battery containers having a larger length in comparison to diameter, batteries including manganese, batteries including zinc and batteries having a predetermined range of weight;

wherein the range of weight is the only selected characteristic;

wherein the range of weights correspond to at least one type of standard-sized alkaline batteries;

wherein the type of standard-sized alkaline batteries is selected from AA, AAA, C, and D;

wherein the recoverable metal is manganese;

a dust collector associated with the comminutor and wherein the comminutor does not produce slurry;

wherein the comminutor is provided with fluid to create slurry;

wherein the slurry is pre-treated to remove soluble metals prior to providing material from the comminutor to the digester; and/or wherein the slurry is formed from the temperature-controlled fluid.

In another embodiment, a method for recovering metal from a feedstock including batteries comprises any combination of the following steps:
  pre-sorting the feedstock to select batteries having a defined characteristics and collecting information about the defined characteristics;
  conveying the selected batteries to a comminution process at a first rate;
  comminuting the selected batteries at a second rate to produce dust and particulates and processing at least one of the dust and particulates to produce a refined feedstock by removing unwanted materials;
  conveying the refined feedstock to a digestion process at a third rate;
  digesting selected metals from the refined feedstock in a selected amount of digestion reagent to create a soluble recoverable material and an insoluble recoverable material while at least periodically monitoring pH of the digestion process;
  separating the soluble recoverable material from the insoluble recoverable material;
  rinsing the insoluble recoverable material with a selected amount of rinsing reagent;
  collecting additional information about at least one of: the first rate, the second rate, the third rate, and the pH of the digestion process;
  processing at least a portion of the information and the additional information to maximize recovery of insoluble recoverable material by making ongoing adjustments to at least one of: the first rate, the second rate, the third rate, the pH of the digestion process, the selected amount of digestion reagent, and the selected amount of rinsing reagent;
  wherein pre-sorting includes a time-of-flight method to determine at least one of the defined characteristics;
  wherein the defined characteristics are selected from: battery size, battery chemistry, battery weight;
  further comprising drying the insoluble recoverable material at a temperature sufficient to drive off impurities;
  wherein separating the soluble and insoluble recoverable materials comprising filtering;
  wherein the rinsing reagent is heated;
  wherein the processing includes at least one of: a demagnetization process and a screening process;
  collecting the dust prior to digestion via a process that does not involve wetting the dust; and
  wherein unwanted materials are removed from the refined feedstock by creating a slurry to dissolve at least a portion of the unwanted materials.

BRIEF DESCRIPTION OF THE FIGURES

The drawings are not to scale unless otherwise noted. The drawings are for the purpose of illustrating aspects and embodiments of the present technology and are not intended to limit the technology to those aspects illustrated therein. Aspects and embodiments of the present technology can be further understood with reference to the following detailed description.

DETAILED DESCRIPTION OF VARIOUS EMBODIMENTS

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

Unless noted to the contrary, all methods and experiments contemplate ambient environmental conditions, including temperature and pressure. Further, common analytical instruments and/or laboratory techniques—including but not limited to standardized testing protocols such as those published by the American National Standards Institute and other, similar organizations—may be used to inform the methods, compositions and other material characteristics disclosed herein.

As used herein the term "batteries" includes alkaline batteries, carbon zinc batteries, or a combination of alkaline and carbon zinc batteries.

As noted above, a number of hydrometallurgical methods for recovering certain metals from feedstock have been proposed. Generally speaking, these methods are premised on the digestion of metals feedstock, followed by selective precipitation in order to recover targeted metals in the precipitate and/or filterate. In order to facilitate digestion, it is usually advisable to grind, crush, shred, or otherwise comminute the feedstock via a hammer mill or other appropriate means.

In the context of consumer batteries, an opportunity exists to further improve existing hydrometallurgical and other metal recovery schemes. For example, the inventors realized the initial comminution step could be further refined and optimized to improve various aspects of the subsequent metal recovery steps.

In one aspect of the invention, the amount of feedstock material is monitored and controlled prior to its introduction to the system. Various system parameters are then dictated, and potentially even varied in response to, observed conditions in the feedstock. In the same manner, additional checkpoints may be introduced at subsequent stages to realize further efficiencies and controls.

In one embodiment, the feedstock is first sorted (or "pre-sorted") to ensure that only batteries meeting certain criteria are introduced to the system. Insofar as primary alkaline and other 1.5 volt battery systems comprise the vast majority of consumer-replaceable batteries in use today, the system may include a pre-sorter that segregates the batteries into different sizes based upon their size and shape.

By way of example rather than limitation, screens, masks, or facings could be used on, in, or adjacent to the entry point of the system and/or along the conveyor system that transports batteries, feedstock and partially processed materials therein. These sorters have apertures corresponding to the diameter or shape of a specific battery type that, in combination with a gravity, cause certain batteries to fall out or otherwise become segregated. A feeder system preferably orients the batteries in the pre-sorter along the elongated cylindrical axis found in common, standard battery sizes. In this manner, non-cylindrical sizes (e.g., prismatic shapes, such as 9 volt batteries, and/or coin and button cell batteries) can be eliminated first.

The conveyor associated with the pre-sorter, as well as all other points in which solid materials (including but not limited to dust and particulates), can consist of conveyor belts, angled or gravity assisted ramps and chutes, rollers, low-friction surfaces used in-combination with air or mechanically assisted impellers and/or vacuums, and other known means for conveying items through a system.

The screens and/or apertures in the pre-sorter correspond to a specific battery diameter and/or shape. These implements may be located intergrally within the floor or sidewalls of the conveyor(s) so that batteries of a specific size fall through the aperture and into a separate collection bin, additional conveyors and/or other processing devices. Alternatively, the conveyor can pass under a wedge or sweep wherein batteries of a particular height (e.g., coin and button cells that have been urged into a flat position) flow into one stream while the larger sizes are diverted into a separate stream.

Batteries so collected may be fed to the recycling system or reprocessed through another pre-sorter. In doing so, the batteries could be re-oriented along a different axis after an initial sorting procedure; for example, a first conveyor might urge the batteries into a flat position to sweep away larger, standard cylindrical sizes from short, flat coin and button cells, with the large cylindrical cells subsequently rotated in a perpendicular fashion or dropped into a "standing position" so as to orient that stream for further processing via gravity-based apertures/slots. Thus, a combination of screens and/or sweeps can be employed to first remove unwanted small size batteries—and particularly coin and button cells which may be any number of different battery chemistry systems. After removal of extremely small sizes, batteries could then be sorted by the most common consumer sizes (with reference to common, U.S. designations) of AAA, AA, C and D, again with larger sizes reserved for last (so as to avoid smaller sizes accidentally being admitted through openings intended for larger sizes).

To the extent that different types of batteries may share a common diameter or feature, additional processing could be employed to ensure that only the desired type of battery chemistry is provided. In a preferred embodiment, the system is specifically configured to identify and capture manganese dioxide-zinc (i.e., alkaline batteries), which represent the overwhelming majority of AAA, AA, C and D sizes sold today. Notably, the battery containers for these standard sizes are elongated, round cylinders having a length (as measured along the cylindrical axis) that is substantially larger than the circular diameter of that cylinder. For the sake of clarity, the International Electrotechnical Commission (IEC) designation for the batteries of interest are, respectively speaking, LR03, LR6, LR14, and LR20. Nevertheless, other 1.5 volt battery chemistries—including but not limited to nickel-oxyhydroxide, nickel metal hydride, lithium-iron disulfide, and other common or previously used chemistries may be processed and/or separated according to certain aspects of the invention. Similarly, prismatic cells and coin or button cells (in which the diameter exceeds the height) may nevertheless be processed according to certain embodiments of the invention.

In the event it is deemed desirable to further sort the feedstock based on a desired battery chemistry (e.g., alkaline batteries only), additional distinguishing factors may be leveraged. For example, lithium-iron disulfide batteries usually have less weight than their alkaline counterparts. Consequently, individual cells could be weighed and further sorted in this pre-sorting operation to remove such lithium cells, which have been found to cause problems to the extent they are comminuted or subjected to certain hydrometallurgical processes. The weighing operation may occur on a cell by cell basis, or in a larger batch in which the overall number of cells is counted or approximated so as to enable computation of an average weight per cell. In the event a batch or cell fails to meet a specified weight range, the system could automatically segregate such cells for further processing and/or removal from the feedstock provided to the recycling system. The precise number of cells could be determined through the use of sensors connected to the presorting conveyor and/or screens.

Alternative methods of sorting, such as a "time-of-flight" sorting and collection system can also be used. In this system, individual cells are moved at a set speed and angle and then permitted to free-fall into a designated space. The heavier cells will fall at a different trajectory in comparison to lighter cells, thereby allowing the cells to be segregated without the need for scales or other instrumentation.

It may also be possible to rely on optical readers in combination with digital computing means to identify the cells in the pre-sorter stage. Here, an optical processor would capture an image and compare it to standard cell sizes and shapes in order to separate the batteries as desired. Additionally or alternatively, it may be possible to employ optical character recognition readers in an attempt to identify pertinent information on the label of the cells and to sort them accordingly. In some embodiments, it may even be possible to rely upon the IEC designation on the label (and/or other standard information) to automatically identify batteries for further processing.

Electrical characteristics of batteries could also be observed, although the fact that cells are expected to be discharged makes this approach to sorting battery chemistries more challenging.

Insofar as some battery collection bins allow consumers to package or bind multiple cells together, some embodiments of the pre-sorter in the inventive system include features to account for this unwanted fact. For example, the initial feed stream could be subjected to sufficient heat and/or chemical treatment so as to remove any tape, string, or other packaging material. In some embodiments, the entire battery label can be removed so as to reduce the amount of non-metallic material collected downstream. The entry port of the collection system could comprise a series of different size apertures, thereby forcing the consumer or user to remove any bindings in order to introduce the batteries into the system/sorter.

Regardless of the level of automation of the presorting operation, human intervention can also be relied upon. For example, the pre-sorting device can preliminarily screen the feedstock, with questionable items segregated for further inspection by a human. In the same manner, human intervention can ensure bins are properly removed/replaced to enable an effectively continuous operation.

The ultimate and preferred goal is to provide a feedstock for the recycling operation that is composed primarily of alkaline batteries. The pre-sorting step preferably eliminates all battery types other than alkaline and carbon zinc batteries. More preferably, alkaline batteries constitute at least 80 wt. %, 85 wt. %, 90 wt. %, 95 wt. %, and greater than 99 wt. % of the feedstock provided to the subsequent stages. By eliminating lithium batteries and/or other battery types that do not include manganese and zinc, system efficiencies are realized.

Also, to the extent the batteries are counted and/or weighed during the presorting, this information can be further leveraged in the subsequent stages of the system, as will be described in greater detail below.

The pre-sorting step may be accomplished by a device or machine that is located remotely from the remainder of the system. Such a device would collect, and possibly even count and weigh, the batteries sorted into its various bins. Specific bins would then be delivered to the remainder of the recycling system for further processing. Such a machine could rely on a facing with apertures, as noted above, with each aperture having a chute, slot, or passageway preferably angling down from the initial entry-point aperture to allow gravity delivery of the inserted battery through the remainder of the sorting device. Alternatively or additionally, scales, counting sensors, optical readers, and/or other implements as described herein would be housed within the sorting machine to facilitate the recycling system. In some embodiments, the invention comprises only the sorting machine itself. Other embodiments contemplate the machine as part of the larger inventive system. Alterations and additions to the sorter machine that are consistent with the purposes of this invention and/or with common issues encountered in interacting with less sophisticated users may also be employed.

During or after presorting (if it is employed), the feedstock material is weighed prior to comminution and digestion. The purpose of this weight is to further inform any number of subsequent processing steps. Additional calculations can be based on this weight, as described below, to facilitate and improve the recycling operation. Additional information about the individual cells and/or overall feedstock composition can be leveraged in a similar manner. For example, reference standards can be used to estimate the approximate amounts of manganese and zinc expected to be recovered from a particular batch or feed, thereby allowing the subsequent digestion reagents to be more specifically controlled, thereby reducing processing time and waste.

The feedstock material is comminuted by, for example, any combination of crushing, shredding, and/or cutting the batteries to separate the free electrode materials (e.g., zinc and/or manganese) from the metal casing. In a preferred embodiment, the batteries are crushed in a hammer mill, resulting in fine electrode powders and larger pieces of metal casings. The fine electrode powders may be separated from the pieces of the metal casings by way of a screen, sieve, shaker table, combinations thereof, and/or other known mechanisms.

In one embodiment, the fine electrode powders are separated from the metal casings by use of a screen. The size of the screen may be selected as desired. In one embodiment, the screen may be a 20 mesh screen. In one embodiment, the screen is part of a shaker table that mechanically separates the larger pieces of metal casings from the fine electrode powders. The dust, particulates containing the desired, recoverable materials, and the unwanted metal casings (e.g., scrap metal) can then be weighed and communicated to an automated system to make adjustments to the rate of speed at which any of the conveyors in the system or operated, the rate of speed or other operating conditions for the subsequent devices (e.g., the hammer mill, the agitators in the digestion tanks, the shaker table, etc.).

A rotary screener may also be employed in the comminution process to further refine the ability to segregate steel scrap, feedstock, and scrap (e.g., plastics and paper). To the extent it is used, the screener (as well as the shaker table) is preferably introduced upstream from the demagnetizer, described below. Alternatively, the demagnetizer could be integrated into the devices effecting the segregation/separation of unwanted materials (e.g., the shaker table, the rotary screens, other screens, the conveyors connecting any of these elements, etc.).

The comminuted feedstock can be passed through a demagnetization process in order to remove ferrous materials. The removal of substantial amounts (if not all) of the ferrous materials should simplify the subsequent digestion and precipitation steps, and extracted ferrous materials may be a desired, recoverable material in and of themselves. Demagnetization can occur by passing the comminuted or partially comminuted feedstock past one or more magnets. The magnets may be permanent magnets or electromagnets, with the latter enabling a simplifying of the controlled removal of collected magnetic material. Keeping in mind that the primary metals of interest in an alkaline battery recycling operation—zinc and manganese—are not magnetic, the material collected at this stage will be ferrous and/or otherwise magnetic. Ferrous and other materials so removed may be introduced into separate recovery operations, discarded or disposed of in a manner that is consistent with current recycling operations.

It may be possible to rely on additional wedges, sweeps, screens, masks, facings, and time-of-flight sorting methods (as described herein) with respect to the comminuted feedstock. The ultimate goals of the comminution process are to reduce the feedstock to an appropriate and consistent size for the subsequent recycling process while simultaneously removing whatever unwanted materials (i.e., materials that are not the subject/target of the recycling operation) to simplify subsequent steps.

Prior to or during comminution, it may be possible to physically disassemble parts of the battery to expedite and./or simplify operation of the system. For example, a system that removes the electrodes and other internal components from the battery, such as any of those described or claimed in United States Patent Publication No. 2015/0118940, may be used to further improve the process. Segregation of the metallic container from the anode gel and/or other components could simplify the overall process and allow for the elimination or optimization of other steps, such as demagnetization.

The pre-sorting, comminution, screening and demagnetizing steps may be configured as a continuous operation or as part of a batch-based system. In either case, the system controls would include software that allows for adjustment of the conveyors that move material from one stage to the next, the operating parameters of the hammer mill, shaker table and/or rotary or other screeners being adjustable in real time to fine tune and optimize system performance. To the extent a continuous operation allows for constant production, multiple components—including collection bins, conveyors, mills, screens, tanks and any of the other devices described or implied herein—can be provided to enable replacement and maintenance without a full shutdown of the system. If a batch-based system is contemplated for the hydrometallurgical separation stages, a continuous system could still be employed for sorting and comminution to create sufficient amounts of dust and/or metal casings for storage and eventual processing/recycling. Also, as with the contemplated consumer-usable pre-sorter device above, it may be possible to conduct these steps remotely from the subsequent hydrometallurgical and/or other processing.

It may also be possible to incorporate heat (in the form of warm air, warmed inert gases, infrared or microwave radiating elements positioned proximate to any of the substantive components/process streams, convection or resistive heating elements incorporated into the conveyor system, and the like) to dry the feedstock and/or comminuted material. Drying should further simplify subsequent steps. Heat exchange and transfer systems could be employed to use heat generated or required by any one step, such as the milling operation, to cooperate with other systems, such as the hot water rinse of precipitate(s).

In addition to or in place of conventional conveyors, vacuum-based mechanisms may be employed to move or assist in the movement of feedstock and comminuted material throughout the system. Vacuums, partial vacuums, and inert/non-reactive gases may also be incorporated in/over the various storage bins and system components to aid in drying material and to minimize unwanted, deleterious reactions. As noted below, such vacuum systems may be connected to dust, particulate or other pollution controls to meet applicable regulatory requirements and/or to ensure optimized recovery of materials.

During comminution, it may be advantageous to minimize dust created by fine powder. This minimization may be accomplished by creating a simple, water-based slurry (e.g., by continuously or periodically spraying, misting or streaming water onto or into the comminution mechanism(s)) and/or by reacting the dust with an alkali hydroxide in the presence of water to dissolve at least a portion of the zinc contained in the fine electrode powders to obtain a zincate solution in combination with insoluble manganese, resulting in a slurry. The goal behind such slurrying would be to reduce the subsequent need to separate soluble zinc from insoluble manganese dioxide. If alternative battery chemistries are specifically targeted for the inventive system, corresponding changes would be made to the slurry management approach.

For alkaline battery recycling, the alkali hydroxide used in the slurry is preferably sodium hydroxide. An automated system can be developed to determine the amount of alkali hydroxide needed and controllably release the alkali hydroxide, based upon the weight of the incoming feedstock, the differential between the initial feedstock and the amount of metal casing removed (i.e., effectively providing an approximate weight of the dust), and/or the number and size of the cells known to comminuted during the period of operation in question. The precise amount of alkali hydroxide needed may be determined based upon a stoichiometric calculation presumes the feedstock comprises a certain percentage of alkaline batteries, with a preferred embodiment contemplating 100% of the feedstock as alkaline batteries of a predetermined size (or a known combination of sizes). Independent measurements of common consumer batteries and/or technical information provided by major battery manufacturers can also be employed to better estimate the amount various metals (e.g., zinc, manganese, iron, etc.) present. Although this disclosure is made in the specific context of dust/powder, it is equally applicable to processing the metal casings as well.

Zincate solution produced in the creation of a slurry may be separated from the insoluble manganese and then reacted with at least one of carbon dioxide or acid to precipitate one or more insoluble zinc compounds (e.g., zinc oxide, zinc carbonate, or a combination thereof). Suitable acids include, but are not limited to sulfuric acid, hydrochloric acid, nitric acid, or a combination of two or more thereof. In one embodiment, the automated system determines the amount of carbon dioxide, acid, or a combination thereof to be added. In one embodiment, the automated system controls the release of the carbon dioxide, acid, or combination thereof.

The insoluble manganese in the slurry may be reacted with an acid to extract out residual zinc compounds and to obtain an acid-extracted manganese oxide product. Suitable acids include, but are not limited to sulfuric acid, hydrochloric acid, nitric acid, or a combination of two or more thereof. In one embodiment, the insoluble manganese is reacted with sulfuric acid.

In a separate embodiment, dust from comminution is collected by a vacuum system. Such systems employ negative pressure to urge the dust toward a filter or collection device. The filter/collection device may be connected to or comprise a storage tank(s) or bin(s), with the dust being reintroduced to the feedstock after it has been captured. The dust is anticipated to consist primarily of recoverable material, insofar as manganese and zinc found in alkaline batteries are usually provided as fine powders during the original manufacture of the batteries. Such devices might include any type of baghouse filters and/or other particle and pollution control devices. It may be possible to connect a number of different components (e.g., the hammer mill, the shaker table, the rotary screen) to the baghouse to ensure sufficient collection of material. The baghouse could be similarly automated so that dust collected there in is automatically and/or seamlessly deposited back into the feedstock stream that is sent to the digestor (either directly or by way of a storage bin/tank).

Proper agitation, mixing, and suspension of the slurry and/or acid solutions is essential, both for purposes of dust control during comminution and during the digestion stages of the hydrometallurgical process for recovering metal(s). Mixing paddles should be sized appropriately within the tanks, and automated controls can be utilized to monitor the characteristics of the incoming feedstock to alter the speed of the mixing paddle(s) and/or the rate of introduction of solids. Tank shape should also be consideration, so as to avoid regions within the tank where sediment may be allowed to settle out from the slurry. A failure to adequate mix and maintain these slurries/solutions can result in incomplete digestion and reaction, as well as create or sustain unwanted levels of impurities in the recovered materials.

In one embodiment, less than 25% solids should be present in the slurry to aid in the intended reactions and maximize the removal of unwanted impurities, such as potassium. More preferably, the slurry comprises less than 20%, less than 15%, and less than 10% solids. Conversely, water in the slurry should be limited to avoid the need to process excessive volumes. Thus, solids should be greater than 5%, greater than 10%, and greater than 15%.

In a batch process, the amount of solids (and, by extension, slurry) should be dependent upon the tank size of the digester, which is described more completely below. As a general rule, the inventors have found that less than 3 pounds of feedstock (in this specific context, batteries prior to comminution) per one gallon of tank capacity is preferred. More ideally, the ratio should be less than 2 pounds of batteries per gallon of tank.

Ultimately, the inventors have found it is preferable to minimize or avoid creating slurry during the comminution process so as to minimize the volume of the resulting feed stream. Nevertheless, to the extent water is required for dust control, the water may be incorporated into the subsequently slurry based steps. Control of the slurry water characteristics, such as temperature and/or pH, may also be leveraged to realize subsequent efficiencies. Insofar as the water provided for the slurry can also be used to control heat (i.e., the water provided to the slurry is effectively cooling water), appropriate feed loops can be created in combination with settling and/or temperature adjustment tanks. Alternatively, water may be continually introduced to the slurry system to ensure proper cooling is maintained.

Figure 2:
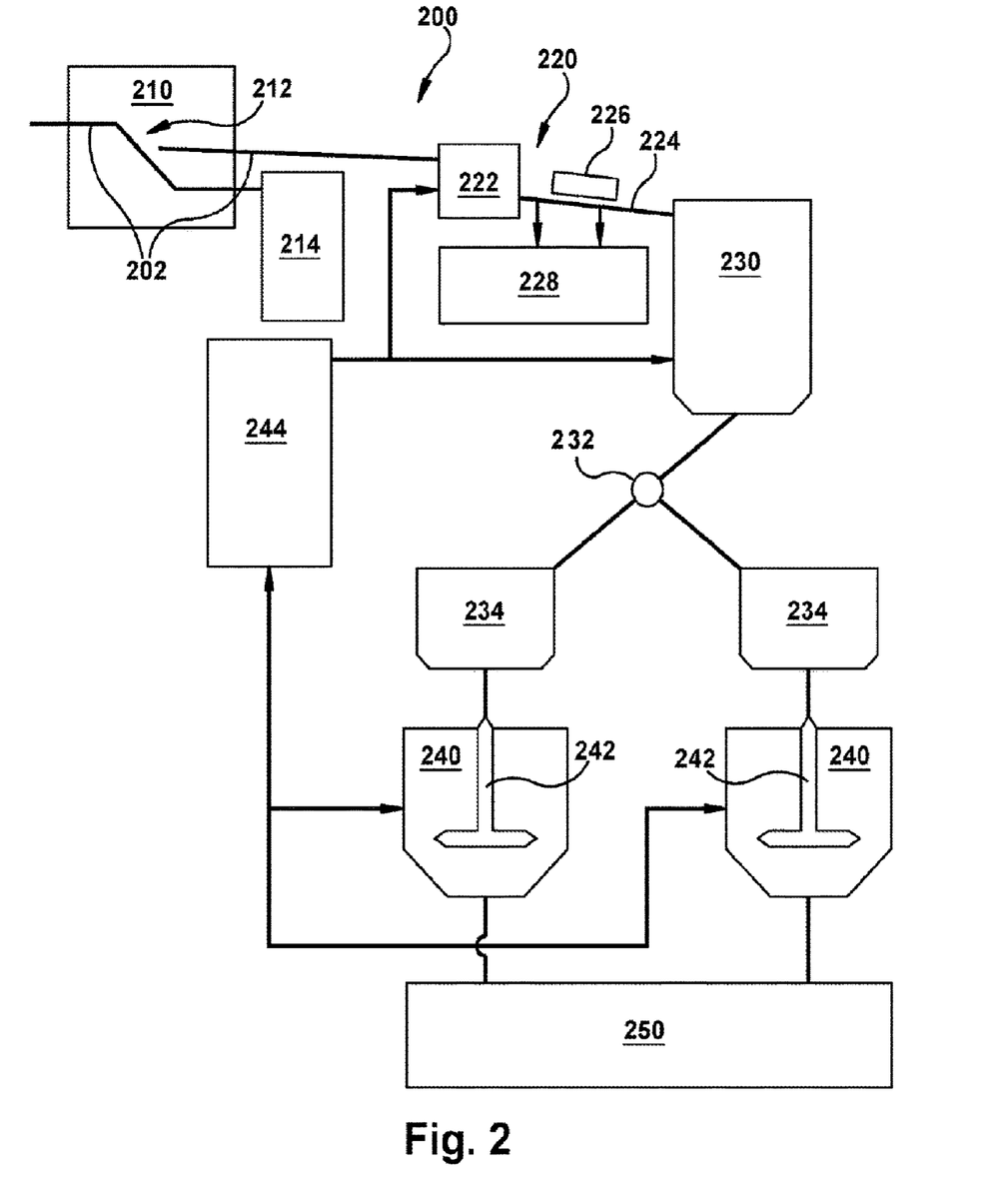
FIG. 2 is a functional block diagram of an automated system for determining the amount of carbon dioxide to react to the zincate solution.

Separately, an automated system determines the amounts of reagent to add during the various reactions and processes (i.e., during slurry creation/process, digestion, and subsequently treatment of precipitates and/or filterates). The automated system may take into account the difference between the weight of the starting material and the weight of the scrap metal, as well as other observed variables in the feedstock or system. The difference in the weight may be used to calculate an expected amount of zinc and/or manganese in the remaining battery material by making certain assumptions about the composition of the batteries originally introduced to the system. Calculations for reagent amounts, and especially those used in the recovery of the zinc and/or manganese (e.g., carbon dioxide, an acid, or a base), are based on the salient chemical reactions and basic stoichiometry. In one embodiment, the automated system determines the amount of carbon dioxide added and controls the release of carbon dioxide during the process of recovering zinc. FIG. 2. In one embodiment, the automated system determines the amount of an acid and/or base to be added during the process of recovering manganese.

In one embodiment, the automated system may monitor the input to and output from the comminution process (e.g., the hammer mill, grinder, crusher, shredder, or cutter). In one embodiment, the initial comminution instrument is a hammer mill. Based on the input and/or output, the operating parameters of the hammer mill may be adjusted. In one embodiment, the operating parameters of the hammer mill may be adjusted manually. In another embodiment the operating parameters of the hammer mill (e.g., current supplied to main motor, speed of intake, etc.) is controlled by the automated system.

In one embodiment, a control panel preferably comprising a microprocessor, not shown, controls the portions of the process controlled by the automated system. In one embodiment, an operator may program the microprocessor with the particular recycling protocol to be performed. Variables in these protocols can include the particular reagent used (e.g., carbon dioxide, specific acid, specific base, etc.), the pH to be maintained, the time that the material is allowed to react with the reagent, the temperature at which the material is to be heated to facilitate a reaction, etc.

Gaseous reagents, such as carbon dioxide, may be introduced into the zincate solution (as well as other slurries in the system) by sparging and similar methods in order to facilitate processing of initial filtrates produced according to some hydrometallurgical processes. An automated version of the inventive system may control the amount and release of carbon dioxide and other reagents via a thermal mass flowmeter. In addition to or in place of carbon dioxide, an acid may be added to the zincate solution. Suitable acids include, but are not limited to, a mineral acid, including sulfuric acid, hydrochloric acid, nitric acid, or a combination of two or more thereof. The acid may be added to the zincate solution in neat, concentrated, or diluted form. The carbon dioxide or acid reacts with the soluble zincate to form insoluble zinc compounds such as zinc oxide, zinc carbonate and admixtures thereof, which precipitate from solution. Generally, the amount of carbon dioxide and/or acid added is effective to reduce the pH of the zincate solution to below 12, below 11, or below 10.5.

In one embodiment, after separation from the zincate solution, the insoluble manganese may be slurried in water and combined with an acid. Alternatively, an aqueous sulfuric acid solution may be combined directly with the insoluble manganese. In one embodiment, the acid is sulfuric acid and may be combined with the insoluble manganese to extract any zinc remaining in the manganese oxide solids, thereby producing acid-extracted manganese oxide. Typically, an amount of acid is used which is sufficient to achieve an pH below about 3.0, below about 2.5, below about 2.0, below about 1.5, or below about 1.0 in the aqueous slurry of insoluble manganese.

Sufficient hold times and agitation should also be provided to ensure complete reactions. For example, the material should be agitated and held at pH for at least 30 minutes, at least 60 minutes, at least 90 minutes, at least 120 minutes, at least 150 minutes, and at least 180 minutes. Conversely, if excessive acid is added (i.e., so that the pH is driven too low) or hold times are employed, yields may suffer. Consequently, pH should not drop below 0.5, 0.6, 0.7, 0.8, 0.9, and 1.0. Hold times should not exceed 300 minutes, 270 minutes, 240 minutes, 210 minutes, and 180 minutes.

The manganese-based precipitate obtained from this final stage can be rinsed one or more times with hot water to ensure the removal of zinc, potassium and other unwanted materials (from the perspective of the precipitate representing the final manganese end product). The hot water may be associated with water used in the creation of slurry or as a separate supply, as noted above. The rinse water may also be incorporated into a closed loop system, including settling tanks/ponds and heat exchangers, so as to minimize the creation of unnecessary waste water. A partially closed system could be employed in which the water is discharged to waste after a set number cycles (or time in the loop), and/or fresh water can be partial injected and spent rinse water drawn off. Further treatment of the hot rinse water can remove the impurities that entrained within the hot rinse stream. In some embodiments, the rinse water is heated to at least 40, 50, 60, 70, 80 and 90 degrees Celsius. Other reagents may be used in combination with or in place of water to further optimize the removal of impurities and/or recovery of desired materials at this stage.

In some embodiments of the invention, the automated system monitors the pH at various stages of the recycling process and provides a warning (e.g., an alarm, a warning light, a warning message, or the like) when the pH at a certain step is not at a predetermined level or within a predetermined range. The automated system may be programmed to adjust the pH by adding an acid or a base until the desired pH is reached. The automated system may also stop the recycling process so that the pH can be adjusted manually. The automated system would then restart when the desired pH is reached. In cases where slurry is present, a centrifuge should be used to separate solids and liquids prior to measuring the pH of the respective components. A failure to separate solids and liquids might lead to gradients that yield variable and/or inaccurate pH readings. In a fully automated system, a pH reading vessel can be integrally designed with pH probes positioned along its length to insure the pH of liquids and solids is monitored.

After removal of the final manganese-based precipitate, the end product should be heated to remove water and other unwanted or undesirable materials. In one embodiment of the invention, the product is heated to at least 500 and, more preferably, at least 550 degrees Celsius to drive off any mercury that may have been introduced by way of feedstock batteries having excessive amounts of mercury.

Figure 1:
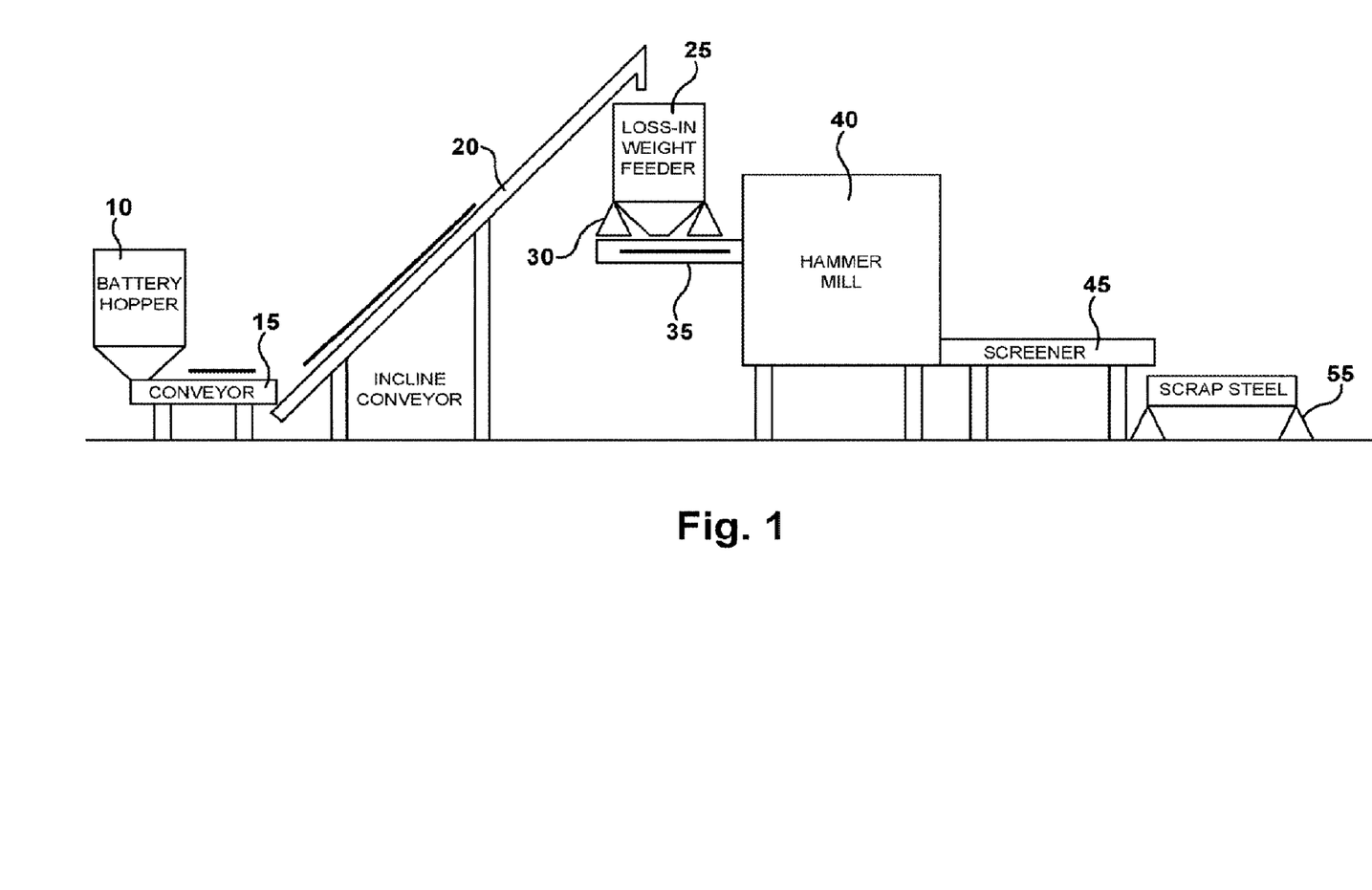
FIG. 1 depicts a schematic of a portion of the alkaline battery recycling process.

FIG. 1 depicts a portion of the process of an embodiment of the invention. In this embodiment, batteries may be added to a battery hopper 10 and then carried to a feeder 25 via conveyor belts 15 and 20. The batteries are weighed in the feeder 25 by a scale 30 to obtain a first weight. This weight of the batteries is communicated to the automated system. After the batteries are weighed, they enter the hammer mill 40 and are crushed to separate the free electrode materials from the metal casings. After being crushed in the hammer mill, the resulting material goes is passed through a screener 45 where the metal (e.g., steel) from the metal casings is separated from the remainder of the resulting material. This scrap metal is then weighed to obtain a second weight at scale 55 and the weight is communicated to the automated system.

FIG. 2 diagrammatically illustrates a configuration of one embodiment of the invention. The relative positioning of the elements are shown, although other configurations are possible. System 200 includes presorting operation 210. A conveyor 202 delivers feedstock to presorter 210. Screens and/or sweeps at 212 ensure that only a particular type of battery is delivered on to subsequent stages, while scrap bin 214 collects unwanted battery types. Integral scales, optical recognition devices and counters (not shown) may be incorporated within presorter 210 to further ensure that only one size and, more preferably, type of battery is delivered as feedstock to the downstream elements.

After presorting, feedstock is delivered to comminution device 220, including hammer mill 222, shaker table/screen 224, demagnetizer 226 and scrap bins 228. Casings and other unwanted material is collected in bin 228 while comminuted feedstock (potentially including dust and particulates) is conveyed to vacuum storage 230.

Diverter valve and gate 232 selectively releases feedstock from storage 230 to loss-in-weight feeders 234. Feeders 234 may include integral feeder screws and scales (not shown) to measure material entering the digestor system 240. Although dual feeders and digesters are shown, any number may be used, depending on the anticipated volume.

Digesters 240 include agitators 242. Cooling water feedback loop 244 is in fluid communication with the digesters 240. Optionally, the loop 244 may also provide cooling water to the comminution system 220 and/or storage 230 for dust management and/or the creation of slurry. To the extent the latter is practiced, alkali hydroxide and/or other processing chemicals and aids may be fed into the loop 244 as fluid is delivered from or to the storage tank associated with the loop 244. Automated and/or centrifugal pH sensors (not shown) may be positioned at multiple points within the digesters 240 and/or feedback loop(s) 244.

Centralized controllers (not shown) may be employed to control the speed of the conveyors 202 throughout system 200, comminution system 220, diverter valve 232, feeders 234, agitators 242 and/or fluid delivered to and from the cooling water feedback loop(s) 244 to adjust the overall throughput of the system. Such centralized controllers may comprise one or more microprocessors and/or programmable logic controllers. Inputs to such controllers may include temperature of the hammer mill, weight of feedstock entering presorter 210, weight of feedstock observed in feeders 234, differential mass removed via scrap bins 214, 228, slurry and digestor pH, and/or other aspects as disclosed herein. Additional sensors may integrated within the components of system 200 to further optimize automated control and optimized performance of the system 200.

Manganese-containing slurry is drawn from the digesters 240 and delivered to precipitate handling system 250. The system may include a first precipitate (e.g., manganese) filter press, one or more drying ovens, filtrate clarifying tank(s) and/or second precipitate (e.g., zinc) filter press, along with attendant waste water treatment systems connected as necessary throughout system 250 (and elsewhere within system 200, as appropriate). System 250 also contemplates a hot water rinse connected to one or both filter presses, either as part of the waste water system, the cooling water feedback loop 244 or as an independent stream/loop. It may be possible to connect the waste water treatment, hot water rinse and/or cooling water feedback loop 244 to realize additional efficiencies, such as reducing the overall amount of waste water produced by the system. Additional storage tanks or ponds could be incorporated to allow for cooling, heating or other necessary treatment of the waste/cooling/hot water rinse streams. Materials draw off the filter presses and/or dried in the drying ovens may be monitored to provide additional input to the control system and/or to determine the overall yield of the process.

Embodiments of the invention have been described above and, obviously, modifications and alterations will occur to others upon the reading and understanding of this specification. The invention and any claims are intended to include all modifications and alterations insofar as they come within the scope of the claims or the equivalent thereof.

What is claimed is:

1. A method for recovering metals from a feedstock comprising discharged batteries, the method comprising:
   pre-sorting the feedstock to select batteries having defined characteristics and collecting information about the defined characteristics;
   conveying the selected batteries to a comminution process at a first rate;
   comminuting the selected batteries using a comminutor operating at a second rate to produce dust and particulates and processing at least one of the dust and particulates to produce a refined feedstock by removing unwanted materials;
   causing a temperature-controlled fluid source to provide fluid of a selected temperature to create a slurry comprising the refined feedstock, the fluid of the selected temperature provided to at least one of (a) the comminutor or (b) a storage tank located downstream of the comminutor and upstream of a digester, wherein the temperature-controlled fluid source comprises a cooling feedback loop in fluid communication with (i) the at least one of (a) the comminutor or (b) the storage tank and (ii) the digester;
   conveying the slurry comprising the refined feedstock to a digestion process within the digester at a third rate;
   digesting selected metals from the refined feedstock in a selected amount of digestion reagent to create a soluble recoverable material and an insoluble recoverable material while at least periodically monitoring pH of the digestion process via one or more pH sensors located at one or more points within the digester within which the selected metals are being digested in the selected amount of digestion reagent, wherein the selected amount of digestion reagent is selected based upon a measurement by the one or more pH sensors;

causing the temperature-controlled fluid source to provide fluid of the selected temperature to at least one of (a) the digester or (b) a precipitate stream produced by the digester;

separating the soluble recoverable material from the insoluble recoverable material;

rinsing the insoluble recoverable material with a selected amount of rinsing reagent, wherein the selected amount of rinsing reagent is selected based at least in part on the information about the defined characteristics;

collecting additional information about at least one of: the first rate, the second rate, the third rate, and the pH of the digestion process via the one or more pH sensors; and processing at least a portion of the information and the additional information to maximize recovery of insoluble recoverable material by making ongoing adjustments to at least one of: the first rate, the second rate, the third rate, the pH of the digestion process, the selected amount of digestion reagent, and the selected amount of rinsing reagent.

2. The method according to claim 1, wherein pre-sorting includes a time-of-flight method to determine at least one of the defined characteristics.

3. The method according to claim 1, wherein the defined characteristics are selected from: battery size, battery chemistry, and battery weight.

4. The method according to claim 1, further comprising drying the insoluble recoverable material at a temperature sufficient to drive off impurities.

5. The method according to claim 1, wherein separating the soluble and insoluble recoverable materials comprises filtering.

6. The method according to claim 1, wherein the rinsing reagent is heated.

7. The method according to claim 1, wherein the processing includes at least one of: a demagnetization process and a screening process.

8. The method according to claim 1, further comprising collecting the dust prior to digestion via a process that does not involve wetting the dust.

9. The method according to claim 1, wherein unwanted materials are removed from the refined feedstock by creating the slurry to dissolve at least a portion of the unwanted materials.

10. The method according to claim 1, wherein at least one of the digester or the comminutor is cooled via the cooling feedback loop associated with the temperature-controlled fluid source.

11. The method according to claim 10 wherein the fluid comprises water.

12. The method according to claim 10, wherein the fluid comprises alkali hydroxide.

13. The method according to claim 1, further comprising, based on the processing of the at least a portion of the information and the additional information, making ongoing adjustments to at least one of the selected temperature of the or a pH of the fluid.

14. The method according to claim 13, wherein the additional information comprises at least one of a measurement of a temperature of the fluid or the pH of the fluid.

15. The method according to claim 1, further comprising heating the rinsed insoluble recoverable material to at least 500° C. to remove water and drive off any mercury present in the rinsed insoluble recoverable material.

16. The method according to claim 1, wherein the slurry is not produced within the comminutor.

* * * * *